Nov. 24, 1964    R. L. HURTLE    3,158,786
OVERCURRENT PROTECTION DEVICE
Filed June 26, 1962
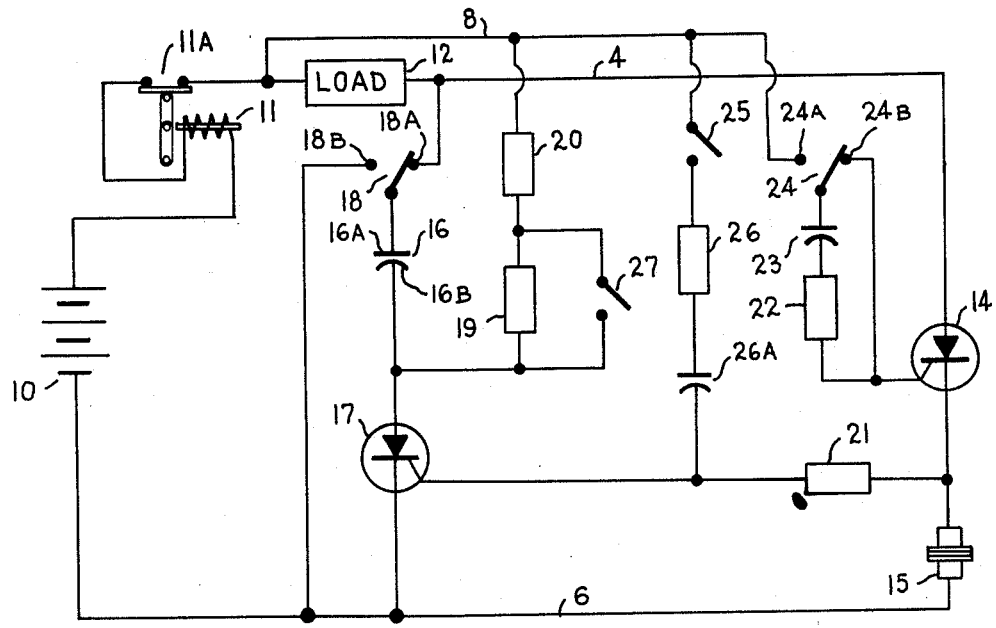
FIG. 1
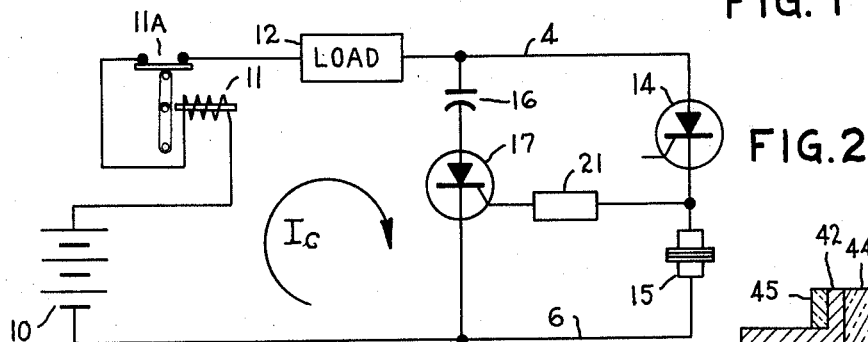
FIG. 2
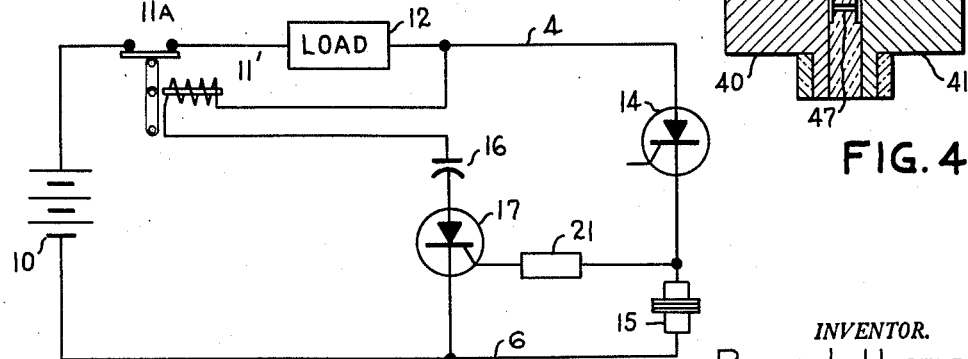
FIG. 3
FIG. 4
*INVENTOR.*
RALPH L. HURTLE
BY Robert T. Casey
*ATTORNEY*

United States Patent Office

3,158,786
Patented Nov. 24, 1964

1

3,158,786
OVERCURRENT PROTECTION DEVICE
Ralph L. Hurtle, West Hartford, Conn., assignor to General Electric Company, a corporation of New York
Filed June 26, 1962, Ser. No. 205,405
6 Claims. (Cl. 317—33)

My invention relates to electrical protective circuits, and particularly to protective circuits of the type utilizing a control device which is adapted to be changed from conducting to non-conducting condition by a predetermined change in current conditions therethrough caused by any means.

In accordance with the prior art, electrical protective circuits have been provided, utilizing as a main current control device, a device having the characteristic that once placed in a conductive condition with respect to current in a given direction, it remains in such condition until such current is reduced to zero by other means. Such other means, for example, may be the application of a reverse-sense voltage to the device such as to reduce the current therethrough to zero for a predetermined time.

A circuit of the type referred to, utilizing a silicon controlled rectifier as the main current control device is shown in Patent No. 3,098,949 issued July 23, 1963 to Leon J. Goldberg, and also in prior application Serial No. 204,768 to Eldon B. Heft filed June 25, 1962, both being assigned to the same assignee as the present invention.

In circuits of the type described, the application of the reverse voltage to the main current control element has the effect of aiding the primary voltage source in producing current through the remainder of the load circuit. The total impedance of the usual circuit elements of the load circuit, including the load itself, may become very small due to short-circuit conditions. The result of this may be (1) to create an undesirably high current in the load circuit, and (2) to place an undesirably high drain on the reverse voltage source. With respect to item 2, this is particularly undesirable when a capacitor is used as the reverse voltage source, since it causes the capacitor to discharge so rapidly that a zero current condition is not maintained on the main control element long enough to insure turn-off of that device.

It is an object of the present invention to provide an electrical protective circuit of the general type shown and described in the aforesaid applications and described above, which circuit shall have the additional advantage of including means operable upon the functioning of the circuit, when changing the main current-control device to non-conducting condition, to provide a pair of physically separable contacts which are movable to open circuit position without arcing.

It is another object of the invention to provide an electrical protective circuit of the type described including separable contacts, and trip means for opening said contacts, and current-control means responsive to overload and short circuit current conditions for reducing the current to zero at a speed slow enough to permit actuation of the trip means, but fast enough to reduce the current below arcing level prior to opening of the separable contacts, whereby no arcing occurs on the contacts.

It is another object of the invention to provide an electrical protective circuit of the type described including a pair of separable contacts and current responsive trip means for opening the contacts, wherein the current responsive means is not in the main load circuit and therefore carries no current during ordinary operation of the device.

2

It is another object of the invention to provide a circuit of the type described which includes a pair of separable contacts and current responsive trip means for causing opening of said contacts, wherein the current responsive trip means provides a means for controlling the rate of discharge of a charge storage means.

In accordance with the invention in one form, an electrical protective circuit is provided including a main control element and means connecting said main control element electrically in series with a power consuming load across an electrical power source. Means is provided for controlling the control element, including an electrical charge storage means and means for connecting the electrical storage means across the first control element so that the voltage thereof appears in opposition to the voltage created across the first control element by the power source. Such connection creates a discharge path for the charge storage means through a portion of the load circuit including the power source and the load itself. A pair of separable contacts are provided in the load circuit, and means is provided for causing automatic opening of the contacts in response to current conditions which exist during the discharge of said charge storage means.

In accordance with one aspect of the invention, the current responsive means is placed in a portion of the circuit which does not comprise a portion of normal load circuit, but does comprise part of the discharge path of the charge storage means, whereby the current responsive device does not carry current normally but operates only upon discharge of the charge storage means.

Also in accordance with the invention, the circuit elements are chosen so that the energy storage capacity of the charge storage means is adequate to actuate the trip device. The trip device is made quick-acting so as to be operable in response to tripping signals which persist for only extremely short periods of time. Finally, the main current control portion of the circuit is designed to operate at a speed which permits actuation of the trip device but which reduces the current below arcing levels before the contacts can separate.

The invention will be more fully understood from the following detailed description and its scope will be pointed out in the appended claims.

In the drawing,

FIGURE 1 is a schematic diagram of an electrical protective circuit incorporating the invention;

FIGURE 2 is a simplified schematic of the circuit of FIGURE 1;

FIGURE 3 is a simplified schematic of another embodiment of the invention, and

FIGURE 4 is a sectional view of a current-limiting device used in the circuit of FIGURE 1.

In FIGURE 1, the invention is shown as incorporated in an electrical protective circuit comprising a direct-current power source 10 having its positive terminal connected to a trip device 11 adapted to cause automatic opening operation of contacts 11a. The contacts 11a control the power supplied to a power consuming load 12, and to a high-voltage line 8. The load circuit is completed through a main current control device comprising a main silicon controlled rectifier 14 in series with a current limiting device 15, the circuit being completed to the negative terminal of the power source 10 by means of the ground line 6.

When the contacts 11a are closed and the controlled rectifier 14 is in conducting condition, the current flow is from the positive terminal of the source 10, through the trip device 11 and contacts 11a, through the load 12, through the controlled rectifier 14, through the current limiter 15, returning to the negative terminal of the power source 10.

For the purpose of applying a reverse-sense voltage across the controlled rectifier 14 upon the occurrence of predetermined current conditions, an electrical charge storage means is provided comprising a capacitor 16. The capacitor 16 is connected in series with a second silicon controlled rectifier 17, in parallel with the series combination of the first silicon controlled rectifier 14 and the signal generating limiter 15. The connecting means comprise conductors 4 and 6. A switch 18 is provided for disconnecting one side of the capacitor 16 from the line side of the controlled rectifier 14 (contact 18a), and connecting it directly to the ground line 6 (contact 18b). The other side 16b of the capacitor 16 is adapted to be maintained substantially at the positive potential of the source 10, and for that reason is connected through the resistors 19 and 20 to the high voltage line 8. A switch 27 is provided for bypassing the resistor 19 to permit rapid charging of the capacitor 16 when desired. Since the controlled rectifier 14 and the limiter 15 normally have no appreciable resistance, the side 16a of the capacitor 16 is substantially at ground potential under normal operating conditions. The capacitor 16 is therefore charge substantially to the potential of the source 10, with the side 16a negative and the side 16b positive. The controlled rectifier 17 serves to normally prevent discharge of the capacitor 16, and for that purpose is normally in a non-conducting condition.

For the purpose of applying a positive voltage pulse to the controlled rectifier 17 upon the occurrence of predetermined current conditions in the load circuit, the positive side of the limiter 15 is coupled through a resistor 21 to the gate electrode of the controlled rectifier 17.

The current limiter 15 utilized in accordance with the invention is preferably of the type shown in my prior Patent No. 3,117,203, issued January 7, 1964, and assigned to the same assignee as the present invention.

While the construction and operation of this type of current limiter is set forth in detail in the aforesaid application, this construction and operation will be described here briefly for the sake of completeness.

Referring to FIGURE 4, the current limiter construction referred to comprises a pair of cylindrical metallic terminal portions 40 and 41, having integral circular flange portions 42, 43, respectively.

A circular disc 44 of ceramic material is positioned between the flanges 42, 43 and is securely bonded thereto. A pair of annular rings 45, 46, also of ceramic material, are positioned against the outer surfaces of the flanges 42, 43, and are also securely bonded thereto. The disc 44 has a central capillary opening 47 therethrough having enlarged end portions as shown. Capillary 47 and its enlarged end portions are completely filled with a liquid conducting medium such as mercury, which is contained therein by the terminal members 40, 41. A filling opening, and sealing means, not shown, are also included, as described in the aforesaid application.

In operation, the current limiter normally has a relatively low resistance, the current passing from the terminal 40 to the terminal 41 through the mercury filled capillary 47. On the occurrence of high current conditions, such as overload or short circuit conditions, the mercury in the capillary 47 is suddenly transformed to a vapor state, although confined to its initial volume. Conduction through the vapor occurs by an arcing process, but the resistance therethrough is such as to limit the current to a relatively low value. The current is not permanently interrupted by the current limiter, however. The change of state of the mercury from liquid conducting condition to vapor high resistance condition occurs very suddenly. Thus, when this change occurs, the line side of the limiter 15, which is normally a small amount above ground potential, suddenly assumes a potential very much higher than ground. Thus a strong positive voltage pulse is applied to the gate electrode of the rectifier 17, placing this controlled rectifier in conducting condition.

For the purpose of permitting manual switching in a manner to be described, the gate electrode of the rectifier 17 is connected through a resistor 26 and capacitor 26A and switch 25 to the high voltage line 8.

For the purpose of placing the main controlled rectifier 14 in conducting condition, its gate electrode is connected through a resistor 22 to one side of a capacitor 23, the other side of the capacitor 23 being provided with switching means 24 for connecting it when desired to the high voltage line 8.

When the switch 24 is in contact with the contact 24b, the capacitor 23 is discharged through the resistor 22. When the switch 24 is placed in contact with the contact 24a, the capacitor 23 receives a sudden charge which causes a positive voltage pulse to appear on the gate electrode of the controlled rectifier 14, placing this rectifier in conducting condition.

The operation of the circuit is as follows. When the parts are in the condition shown in FIGURE 1, current flows through the load circuit as previously described, including the load 12 the controlled rectifier 14 and the signal generating limiter 15. Upon the occurrence of abnormally high current conditions in the load circuit, the signal generating limiter 15 is suddenly transformed to a high impedance condition in the manner described above. This causes a relatively high voltage drop to appear across the limiter 15, and this is applied through resistor 21 to the gate electrode of the controlled rectifier 17 and places the controlled rectifier 17 in conducting condition. When this occurs, the capacitor 16, which is charged as previously described, is connected in effect directly between the conductor 4 and the ground conductor 6. Thus the potential existing on the capacitor 16 thereupon appears across the series combination of the controlled rectifier 14 and the signal generating limiter 15. Since this voltage is equal and opposite to that of the source 10, it reduces the net driving voltage existing across the rectifier 14 and the limiter 15 to zero or to some negative value, depending on how much of the voltage source 10 potential exists across these at that time.

In addition, referring to the simplified schematic of FIGURE 2, it will be observed that when the capacitor 16 is thus connected between the conductor 4 and the ground conductor 6, it cannot discharge through the limiter 15 and the controlled rectified 14 because of the unidirectional characteristic of the rectifier 14.

It will be observed, however, that a discharge path is available to the capacitor 16 at this time through the controlled rectifier 17, through the conductor 6, through the source 10, and thence through the load 12. Since this path exists, the capacitor discharges through this path until the pre-stored charge thereon disappears. While this is occurring, however, the current through the rectifier 14 and the limiter 15 is maintained at zero. This places the main controlled rectifier 14 in non-conducting condition. Therefore the current remains at zero through the load circuit even after the charge of the capacitor 16 is dissipated, thereby leaving the circuit in "off" condition.

In accordance with the invention, a current responsive means is also provided, comprising a pair of separable contacts 11a and a current responsive means 11 for providing a physically separable contact opening device for the circuit.

The contact opening device 11–11a need not be a circuit breaker in the conventional sense of the word, that is, one that is capable of interrupting high currents by means of its contacts. I have discovered that because of the ultra-high speed action of the circuit described in reducing the load current to zero following generation of a tripping signal by the device 15, the contacts 11a cannot open fast enough to experience any perceptible arcing.

In accordance with the invention, the trip device 11 is set to operate in the neighborhood of double the rated load current of the circuit. For example, if the normal load current is 5 amperes, the signal generating device 15 may be set to develop a tripping signal when the current reaches 7 amperes. If the signal generating device responds to a current of 7 amperes in the load circuit, it will be observed that since the capacitor 16 adds its voltage in series relation to that of the source 10 when discharging, the current in the discharge path, will be substantially double the current causing tripping, that is about 14 amperes. The trip device 11 therefore may be set for operation at about 10 amperes. As a result, the trip device 11 will never be called upon to operate initially, but will only come into operation when the capacitor 16 is discharging. Moreover, I have discovered that the time duration of current due to the discharge of capacitor 16 is of such short duration that physically movable contacts of the type required to carry the current at 11a cannot move to open condition fast enough to experience any arcing. Thus, for example, such discharge current in circuits of the order of 5 amperes will not last more than about 50 to 100 microseconds. The time required for a pair of contacts which are held in closed position to move to separate is from 10 to 60 times as long, or from 500–3000 microseconds.

It will be observed that, with rated load current flowing, the contacts 11a will be operated to open condition whenever the capacitor 16 is discharged. Thus if the circuit is manually turned off by means of closing the switch 25, which places a positive pulse on the gate of the rectifier 17, the capacitor 16 will be discharged and will cause automatic opening of the contacts 11a.

Thus there is provided, in accordance with the invention, a simple and inexpensive means for providing a positive, visible open contact condition supplementing the electronic interrupting action of the main circuit.

Referring to FIGURE 3 there is shown in simplified schematic form another embodiment of the invention. In this embodiment, the trip means 11 is placed in series with the capacitor 16 between the conductors 4 and 6. It will therefore be observed that in this form, the trip member 11' carries no current during normal operation of the circuit. When the capacitor 16 is discharged, however, the trip member 11' does carry current and operates to cause automatic opening of the contacts 11a' in the main load circuit.

It will also be observed that an extra benefit of my invention is that the trip member 11', comprises an impedance member which delays the rate of discharge of the capacitor 16, thereby assuring that negative voltage will be maintained across the main controlled rectifier 14 for a period of time sufficiently long to insure that this rectifier is turned to the off condition. For example, if the load 12 were to be completely short-circuited, it will be seen by reference to FIGURE 2 that there would be no impedance in the capacitor discharge circuit except the internal impedance of the source 10 and the relatively minor impedance of the capacitor 16 itself and the rectifier 17. Under such conditions, the capacitor 16 would discharge so rapidly that the current might not be maintained at zero in the load circuit through the rectifier 14 long enough to place this rectifier in a non-conducting condition. With the trip device 11 in the circuit, however, the discharge time is prolonged. It will be observed, moreover, that the desired impedance for this purpose is provided, in accordance with the form of the invention shown in FIGURE 2, without creating any power loss or voltage drop in the normal load circuit.

It will be understood that the values of the capacitor 16 and the impedance of the trip member 11 should be selected in accordance with well understood electrical principles to insure that the capacitor 16 has energy storage capacity sufficient to actuate the trip member 11, as well as to maintain a reverse voltage across the main controlled rectifier 14 for a sufficiently long period of time.

While I have shown my invention in only two specific forms, it will be appreciated that many modifications thereof may readily be made. I therefore intend, by the appended claims, to cover all such modifications as fall within the true spirit and scope of the invention.

What I claim as new and desire to secure by Letters Patent of the United States is:

1. An electrical protective circuit comprising:
   (a) a main current control device,
   (b) means for connecting said main current control device electrically in series with a power consuming load across a source of electrical power,
   (c) electrical charge storage means,
   (d) means for connecting said electrical charge storage means electrically in parallel with said main current control device upon the occurrence of predetermined current conditions in said load circuit, whereby said charge of said charge storage means is permitted to be discharged through said power source and said power consuming load,
   (e) a pair of relatively separable contacts, means for restraining said contacts in closed condition, and
   (f) trip means connected electrically in series in said discharge path of said charge storage means for causing automatic opening of said contacts upon discharge of said charge storage means.

2. An electrical protective circuit comprising:
   (a) a main current controlled rectifier,
   (b) means for connecting said main controlled rectifier electrically in series with a power consuming load to an electrical power source,
   (c) a capacitor,
   (d) means for maintaining a charge on said capacitor substantially equal to the potential of said power source,
   (e) means for connecting said capacitor electrically in parallel with said main controlled rectifier upon the occurrence of predetermined current conditions through said rectifier in a sense opposite to that of said power source, whereby to maintain current through said main controlled rectifier at zero for a period of time sufficient to place said main controlled rectifier in non-conducting condition,
   (f) said capacitor having a discharge path through said power source and said power consuming load when connected electrically in parallel with said main controlled rectifier,
   (g) at least one pair of relatively separable contacts in series with said power consuming load,
   (h) means for holding said contacts in closed circuit condition during normal operation of said circuit, and
   (i) trip means connected electrically in series in said discharge path and operable to cause automatic opening of said contacts upon discharge of said capacitor.

3. An electrical protective device comprising:
   (a) a main controlled rectifier,
   (b) means for connecting said main controlled rectifier electrically in series with a power consuming load across a source of electrical power,
   (c) a capacitor,
   (d) means for maintaining a charge on said capacitor substantially equal to that of said electrical power source,
   (e) means for connecting said capacitor electrically in parallel with main controlled rectifier upon the occurrence of predetermined current conditions in said load circuit in such a sense as to oppose the voltage of said power source,
   (f) said capacitor having a discharge path through a portion of said load circuit including said power source and said power consuming load,
   (g) a pair of relatively separable contacts electrically in series with said power consuming load,
   (h) means holding said contacts in closed condition,
   (i) said power consuming load, said main controlled rectifier, and said source, all being in series relation normally and comprising a primary load circuit, and (j) trip means electrically in series with said capacitor, but not contained in said primary load circuit, said trip means being operable upon discharge of said capacitor to cause automatic opening of said contacts.

4. An electrical protective circuit comprising:
(a) a main controlled rectifier,
(b) means for connecting said main controlled rectifier electrically in series with a power consuming load across an electrical power source,
(c) a capacitor,
(d) means for maintaining a charge on said capacitor substantially equal to said electrical power source,
(e) a signal generating device in series with said main controlled rectifier,
(f) a second controlled rectifier connected electrically in series with said capacitor,
(g) means connecting said series combination of said capacitor and said second controlled rectifier electrically in parallel with said series combination of said main controlled rectifier and said signal generating device,
(h) said second controlled rectifier including a gate electrode,
(i) means coupling the voltage drop existing across said signal generating device to appear between said gate electrode and said cathode electrode of said second controlled rectifier, whereby a predetermined voltage drop across said signal generating device causes said second controlled rectifier to be placed in conducting condition, thereby connecting said capacitor across said main controlled rectifier in such a sense that the charge of said capacitor opposes the charge of said power source on said main controlled rectifier and reduces the current through said main controlled rectifier to zero,
(j) said capacitor, when said second controlled rectifier is placed in conducting condition, having a discharge path including a portion of said load circuit through said electrical power source and said power consuming load, a pair of separable contacts electrically in series with said load, and
(k) trip means electrically in series in said discharge path of said capacitor and operable upon discharge of said capacitor to cause automatic opening of said contacts.

5. An electric protective circuit comprising:
(a) a main controlled rectifier,
(b) means for connecting said controlled rectifier electrically in series with a power consuming load across a source of electrical power,
(c) a capacitor,
(d) means for maintaining a charge on said capacitor substantially equal to said charge of said power source,
(e) a signal generating device electrically in series with said main controlled rectifier,
(f) a second controlled rectifier electrically in series with said capacitor,
(g) means connecting said series combination of said capacitor and said second controlled rectifier electrically in parallel with said series combination of said main controlled rectifier and said signal generating device,
(h) said second controlled rectifier including a gate electrode and a cathode electrode,
(i) means connecting said signal generating device to said second controlled rectifier to impress the voltage drop existing across said signal generating device between said gate electrode and said cathode electrode of said second controlled rectifier,
(j) said capacitor having a discharge path when said second controlled rectifier is in said conductive condition, said discharge path including said electrical power source and said power consuming load,
(k) a pair of separable contacts electrically in series with said load, and
(l) trip means electrically in series with said capacitor but not electrically in series with said load and said main controlled rectifier, said trip means being operable upon discharge of said capacitor to cause automatic opening of said separable contacts.

6. An electrical protective circuit as set forth in claim 4 wherein said discharge of said capacitor is of sufficient magnitude and duration to actuate said trip means but is of such short duration as not to afford time for said separable contacts to separate before said current is reduced below arcing levels.

References Cited in the file of this patent
UNITED STATES PATENTS
3,042,838    Bedford et al. _____ July 3, 1962

OTHER REFERENCES
"Applications and Circuit Design Notes," Bulletin D420, published by Solid State Products, Inc., page 19, FIG. 29, February 12, 1959.